Feb. 23, 1937.   J. L. BARR   2,071,451
MOVABLE VEHICLE LIFTING DEVICE
Original Filed April 22, 1929   2 Sheets-Sheet 1
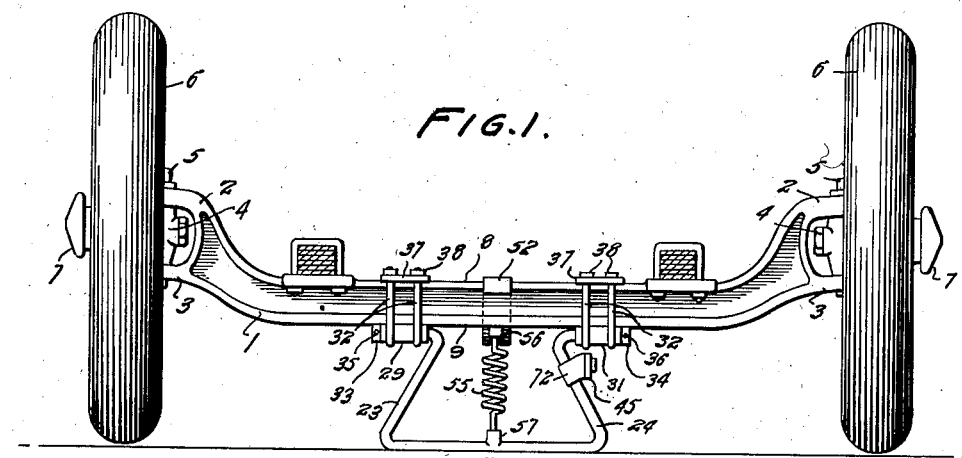
Inventor
JOHN L. BARR Feb. 23, 1937. J. L. BARR 2,071,451
MOVABLE VEHICLE LIFTING DEVICE
Original Filed April 22, 1929  2 Sheets-Sheet 2
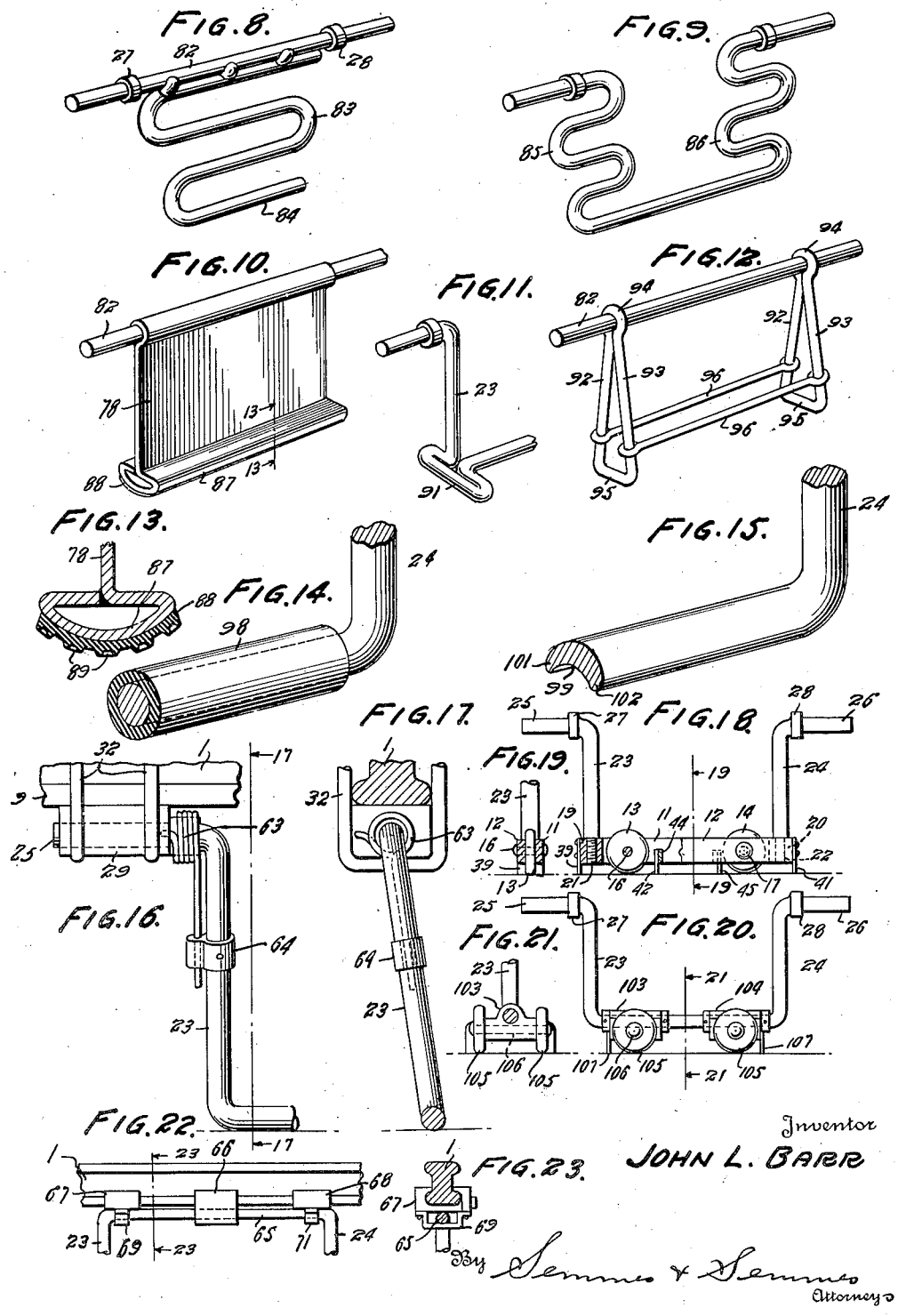
Inventor
JOHN L. BARR Patented Feb. 23, 1937

2,071,451

UNITED STATES PATENT OFFICE 2,071,451

MOVABLE VEHICLE LIFTING DEVICE

John Lester Barr, Chevy Chase, Md.

Original application April 22, 1929, Serial No. 357,254. Divided and this application January 23, 1934, Serial No. 707,959

4 Claims. (Cl. 280—150)

This invention relates in general to lifting devices and more particularly has reference to an apparatus for lending facility to turning the wheels with which steering is effected when operating a vehicle in confined areas and for moving the elevated end of a vehicle when the wheels are raised.

This application is a division of my application Serial No. 357,254, filed April 22, 1929.

Previous to this time in operating a vehicle in confined areas, such as are often encountered when parking on busy thoroughfares, extreme difficulty is sometimes experienced in turning the wheels of a car when momentarily stationary, while maneuvering for the desired position of the vehicle. Very often moreover the space is too confined for allowing the proper positioning of the vehicle by manipulation of the steering wheels.

In the same manner it has often been a task taxing the energies of a driver to operate the steering mechanism while attempting to position the vehicle so as to afford passage out into a thoroughfare from between vehicles and other obstructions stationed in the front and rear of the space. Heretofore there have been provided devices to aid in the turning of a vehicle wheel with which the steering is effected while in a stationary position, but such apparatus is usually attended by certain disadvantages which this invention seeks to overcome.

In general, the prior devices have provided for lifting one wheel of a car from contact with the roadbed, but it is manifest that such expedients have not afforded as great an ease of steering as is desirable under such conditions, and such apparatus has not been adapted for automatic locking to prevent inadvertent collapse of the elevated end of the vehicle.

Furthermore, these devices often have had a tendency to slip along a pavement without taking positive hold. Also, further movement of a vehicle elevated on a support has been impossible while so positioned, thus no advantage being obtained in spaces too confined for maneuvering the car by operation of the steering wheels.

An object of this invention is to provide an apparatus for relieving the weight of a vehicle upon the wheels with which the steering is effected tending to move to a vertical position previous to operation.

Another object of this invention is to provide an apparatus for simultaneously elevating the wheels by which steering of a vehicle is effected which may be locked in position when the vehicle is raised.

A further object of this invention is to provide an apparatus for relieving the weight on the wheels of a vehicle by which the steering is effected which may be attached to the frame of a conventional car without any modifications in the structure thereof.

A still further object of this invention is to provide an apparatus for relieving the weight of a vehicle upon the wheels with which the steering of the same is effected having provision for the movement of the end of the vehicle when the steering wheels are raised.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular construction, which for the purpose of explanation have been made the subject of illustration.

In the drawings forming a part of the specification:

Figure 1 is a front elevational view showing a support for elevating the steering wheels of a vehicle mounted on the under side of the front axle thereof;

Figure 2 is a sectional view showing the manner of positioning another form of support;

Figure 3 is a front elevational view of a modified form of support;

Figure 4 is a side elevational view showing the support mounted on the end of a vehicle frame;

Figure 5 is a front elevational view of a support having a spring attachment tending to move the same to a vertical position when lowered;

Figures 6 through 12 are perspective views of modified forms of supports;

Figure 13 is a sectional view taken on line 13—13 of Figure 10;

Figure 14 shows another form of the base contact portion applicable to the support shown in Figure 5;

Figure 15 is a perspective view of another modified form of the base contact portion, made integral with the bottom of the support;

Figure 16 is a front view of one of the legs of the support shown in Figure 5 shown with a modified form of spring attachment;

Figure 17 is a side view taken on line 17—17 of Figure 16;

Figure 18 is a front elevational view of a modified form of support of the character shown in Figure 2 having rollers mounted on the bottom;

Figure 19 is a side view taken on line 19—19 of Figure 18;

Figure 20 is a front elevational view of another form of support having a plurality of pairs of rollers mounted on the bottom thereof;

Figure 21 is a side view taken on line 21—21 of Figure 20;

Figure 22 is a front elevational view showing a modified form of mounting the support at a point in a vertical plane with the longitudinal axis of the vehicle for freedom of movement with respect to the axle of a vehicle.

Figure 23 is a sectional view taken on line 23—23 of Figure 22.

Referring more particularly by numerals to the drawings in which the same and similar elements are designated by like symbols of reference throughout, and more particularly to Figure 1, there is shown the front axle 1 of a vehicle bifurcated at each end as at 2 and 3. Stub axles 4 are mounted between the furcations and held by kingpins 5. Stud shafts (not shown) project from the stub axles 4, upon which are positioned wheels having tires 6 mounted thereon, the wheels being held in the conventional manner on the axle and the mounting protected by hub caps 7 fitted on the shaft. The axle 1 is formed with top and bottom flanges 8 and 9.

The support for elevating the steering wheels is mounted on the underside of the axle and extends over on each side of a point in the plane with the longitudinal center of gravity of a vehicle. The support is subject to a number of modifications, as will be noted in the several figures of the drawings and with reference to my copending application Serial No. 350,685, filed March 28, 1929, of which the present application is a continuation in part.

According to the preferred embodiment, a support of the character shown in Figure 18 is employed. This form of support comprises a base portion having a plurality of sides 11 and 12, with rollers 13 and 14 mounted therebetween, and held by axles 16 and 17 respectively, extending through the sides of the base portion. A pair of blocks 19 and 20 having threaded apertures are fixedly mounted between the ends of the base portions 11 and 12, adapted to receive reduced threaded extensions 21 and 22 formed on upright arms 23 and 24. The arms 23 and 24 are turned over at the ends so as to provide horizontal journals 25 and 26.

The horizontal journals 25 and 26 are provided with collars 27 and 28 adjacent the upright arms adapted to fit against bearings 29 and 31 mounted on the underside of the axle 1 and held by a plurality of clamps 32 as shown in Figure 1. The horizontal arms 25 and 26 are adapted to extend through the bearings 29 and 31 respectively, and fixed therein by collars 33 and 34 mounted on the ends, the same being secured by set screws 35 and 36.

The support is mounted across a point in a plane with the longitudinal center of gravity of a vehicle and is of such a length that when it is vertically positioned the weight of the vehicle on the tires 6 will be relieved. It is preferable that the support be constructed of sufficient length to elevate the tires entirely from the roadbed when the same is placed upright. The journals 25 and 26 of the support are free to move in the bearings 29 and 31 so that the support may be readily lowered or raised. The clamps 32 holding the bearings on the under side of the axle 1 extending through plates 37 resting on the top of the axle and are held by nuts 38.

As the support is free to swing it will be apparent that when it is lowered it will rest on the surface supporting the vehicle, but extending below the periphery of the tires it will not normally fall in a vertical position. To raise the end of the vehicle upon which the support is mounted it is intended that the vehicle be driven backward if the support is positioned in the rear of the axle, whereupon the rollers 13 and 14 will engage the surface upon which the same rest transverse to the line of travel, and the front wheels may be lifted from the ground by the driving force exerted by the rear wheels, under the control of the driver.

When the support is in an upright position, the weight of the vehicle on the elevated tires is relieved and the vehicle may be held stationary in this position by application of the brakes on the back wheels until the steering wheels are turned to the desired angle. The brakes may then be released and the car driven off the support. If the support is positioned in the front of the axle, the steering wheels may be raised by the reverse operation, that is by driving the vehicle forward. In a like manner, if it is desired to discontinue using the support when it is resting in front of the axle the car may be driven over the same so that the support is placed in the rear of the axle where it then may be raised to inoperative position.

In maneuvering for the desired position of a vehicle it is of course apparent that the operation of bringing the end of the vehicle up on the support, to allow free turning of the steering wheels, may be repeated any number of times until the vehicle is either driven in or out of a confined area, of the character of a parking space.

The foregoing operation is the same as is employed in using the device disclosed in my copending application reference to which has already been given. According to the present invention, the rollers 13 and 14 mounted on the bottom of a support are intended to allow movement of the vehicle in the direction at substantially right angles to the normal line of travel, if the vehicle cannot be properly positioned by manipulation of the steering wheels.

When the support is in an upright position, relieving the weight of the vehicle on the steering wheels and in the present instance elevating the same from the roadbed, the end of the car supported on the rollers may be pushed in the desired direction a point between the rear wheels acting as a pivot. In this manner both the front and rear wheels may easily be parked adjacent a curb.

On the outer face of each of the blocks 19 and 20, mounted between the sides of the base portion of the support, are fastened strips 39 and 41 extending downwardly to a point in a plane with the periphery of the rollers 13 and 14 and in the line of travel thereof. Similar strips 42 and 43 are secured on bars 44 mounted transversely between the sides 11 and 12 forming the base portion of the support, between the rollers 13 and 14. These strips are intended to divert movable obstructions from the course of the rollers and may be made of any suitable material of sufficient strength to turn stones or other movable irregularities in the road surface. Also, these strips may be made of a suitable spring metal extending slightly below a point in the plane with the periphery of the rollers to grip the road surface when it is desired to raise the end of the vehicle on the support, and prevent slipping of the rollers preparatory to elevating the end of the vehicle.

The position of the support, according to the preferred embodiment of this invention, may be controlled by the operator while driving the vehicle, as shown in Figure 2. One end of a connecting rod 45 is pivoted to the arm 24 on a pin 46 integrally constructed thereon or attached in a suitable manner, and the other end of the rod hinged on a lever 47 through a pin 48. The lever 47 is pivoted on a bracket 49 mounted on the under side of the frame of the vehicle, the lever extending into the driving compartment for operation by the person manipulating the steering wheel of the vehicle.

When the lever is drawn backward, the support is lowered or when moved forward the same raised to a horizontal position. The bracket is formed with a plurality of notches 50 for engagement with a spring operated pin 51, movement of which is controlled by the operator of the vehicle through a rod (not shown), encased in the lever. Thus, if the support is raised to a horizontal position, it may be fixed in place by engagement of the pin 51 in the rear notch 50, and not interfere with the road clearance of the vehicle. A leaf spring 52 is mounted on the axle 1, adapted to be engaged by the support when the same is raised to a horizontal position. The support when held against the spring has no tendency to rattle or to become loosened by constant movement. The spring 52 is connected to a strap 53 extending around the axle and held by a rivet 54.

When it is desired to make use of the support the catch is released by the operator so that it is free to swing and allowed to come in contact with the road surface. After the vehicle has been driven on the support in the manner already described, it will automatically be locked in the vertical position by the pin 51 coming to engagement with the forward notch 50 in the bracket. If a fixed position of the support is not desired, however, the pin 51 may be held down by the operator or locked out of contact with the notch in any suitable manner.

When the support is locked in a vertical position, the elevated end of the vehicle may be moved on the rollers by pushing the vehicle, or if there is sufficient curve in the crown of the roadway, the vehicle may move to the side by the force of gravity. Movement of the elevated end of the vehicle may be regulated by controlling the brakes on the rear wheels, that is of the rear wheels are locked the elevated end of the vehicle will not move except if pushed, but if free the end of the vehicle may be allowed to swing through an arc, the vehicle pivoting on a point between the center of the rear wheels which will revolve in opposite directions.

It has been found advisable under certain conditions to connect the support with a spring attached to the vehicle, tending to move the support to a vertical position and prevent slipping of the support on the road surface when it is lowered for elevating the end of the vehicle. In Figures 1, 5, 16, and 17, are illustrated several forms of springs suitable for attachment to the support.

In Fig. 1, one end of a helical spring 55 is mounted on the axle 1 of the vehicle at the center thereof and held by a clamp 56, the other end being seated in a socket 57 formed in the center of the top of the base portion of the support. This spring tends to move the support to a vertical position when it is placed either to the rear or front of the axle and lends to a more positive gripping of the base portion with the road surface. In Figure 5 a round spring 58 is mounted on the under side of the axle at the center thereof and held by clamp 59. The ends of the spring 58 are passed through eyelets 61 and 62 formed or suitably attached on the arms 23 and 24 of the support. This type of spring also acts to center the support in a vertical position irrespective of which side of the axle it is placed on.

In Figure 16 is shown a helical spring 63 mounted over the journal 25 of the support and one end seated in the bearing 29. The other end of the spring is extended downwardly adjacent the arm 23 of the support and connected therewith by a collar 64 having a channel formed at the side thereof adapted to receive the end of the spring. This spring likewise works to move the support to a vertical position. It will be appreciated that a similar spring may be mounted on the other journal of the support if so desired.

In bringing the end of the vehicle up on the support, a twisting effect is sometimes encountered, which may strain a rigid connection between the support and the vehicle. In Figures 22 and 23 is depicted a mode of attachment designed to prevent damage to the support by such twisting movements which at most are comparatively slight. In this construction the arms 23 and 24 of the support are integrally constructed with a bar 65 adapted to lie parallel with and on the under side of the axle. The bar is held in the center by a clamp 66 suitably held on the axle at a point in a plane with the longitudinal center of gravity of the vehicle, and having provision for lateral movement of the support. The ends of the bar 65 adjacent the arms are held against blocks 67 and 68 clamped on the axle by brackets 69 and 71 screwed thereto, allowing lateral movement of the end of the bar. It is obvious that the form shown in Figures 22 and 23 is provided with rollers as in the analogous forms shown in Figures 18, 19, 20 and 21.

The support is, of course, subject to a number of modifications, as is noted in Figures 1, 3 and 5 to 12, inclusive. In Figure 1 is shown a support having the arms 23 and 24 bent inwardly from the ends of the base portion to lend a slight resiliency to the support and a strap 72 mounted on the arm 24 for attachment with the operating lever 46 through the connecting arm 45.

In Figure 3 the support is shown with the base portion bent upwardly in the center to provide a pair of contact legs 73 and 74 adapted to rest on each side of a point in a plane with the longitudinal center of gravity of a vehicle when the support is positioned upright. This construction also allows for a small degree of flexibility by reason of the curvature of the base portion.

In a type of support depicted in Figure 6, the arms 23 and 24 are joined by connecting rods 75 and 76, and turned over at the bottom to form axles 77 and 78 for receiving the rollers 13 and 14. In this construction the rollers may be dispensed with and the bottom of the arms allowed to serve as feet. In Figure 7, the support is shown as constructed of an integral plate of metal 78 turned over at the bottom and the edge serrated as at 79 to lend a more positive gripping effect to the base portion. One side of the support is provided with a projection 81 for attachment of the connecting arm 45 to the operating lever. The top of the support is turned over about a bar 82 extending out on each side of the support for seating in the bearings 29 and 31. This support is intended to insure a rigid structure. The collars 27 and 28 are dispensed with, the sides of the support acting to retain the bar 82 in proper position in the bearings in this construction.

The support shown in Figure 8 includes the bar 82 having the collars 27 and 28 mounted thereon and a curved supporting arm 83 formed with a horizontal base contact portion 84 welded to the bar. This support is adapted to afford a resiliency of structure, both as regards vertical forces and for movement around a vertical axis caused by twisting which sometimes occurs in the use of the support. The support shown in Figure 9 is similar to that shown in Figure 5 with the exception of the arms 23 and 24, which are bent over as at 85 and 86 to provide a flexible support of the character shown in Figure 8.

The support shown in Figure 10 is similar to that depicted in Figure 7 except the base portion is bent over to form a shoe 87 better shown in Figure 13. This shoe presents a curved base contact portion upon which may be mounted a flexible bottom plate 88 made of rubber or other suitable material having vacuum cups 89 formed thereon to afford a more positive gripping of the road surface than would otherwise be obtained.

In Figure 11 is shown a support similar to that depicted in Figure 5 having the ends of the arms bent over at the bottom at right angles and likewise the ends of the base portion, to form bottom supports 91 adapted to afford extended longitudinal contact surfaces as well as extended transverse contact portion residing in the various forms of supports already described.

In Figure 12 is shown a type of support having a plurality of pairs of integrally constructed arms 92 and 93 bent around the bar 82 to form collars 94 and spread at the bottom and connected by integral cross pieces 95, adapted to serve the same purpose as the base 91 of the support shown in Figure 11. The pairs of arms are joined by connecting rods 96 bent around each of the arms as at 97.

In Figure 14 is shown a support similar to the support shown in Figure 5 having a section of rubber tubing 98 mounted on the base contact portion to afford a more secure engagement with the road surface than could be obtained by a metallic member. This tube may be either fixedly mounted on the base portion or loosely placed for rotation, to prevent wear of a single area thereof. Another form of base contact portion is shown in Figure 15 in which the bottom is hollowed out as at 99 so as to provide a plurality of transverse contact surfaces 101 and 102. Also in this construction the base may be somewhat flattened out so as to increase the distance between the contact surfaces.

In Figures 20 and 21 is also shown a type of support similar to that shown in Figure 5 having a pair of carriages 103 and 104 either pivoted or fixedly mounted on the base contact portion. A plurality of rollers 105 are mounted on the carriages through axle 106, adapted to afford a support similar to that shown in Figure 18. The carriages are also provided with strips 107 to divert obstructions from the path of the rollers in the same manner as the strips shown on each side of the rollers in Figure 18. If so desired, the rollers 105 may be dispensed with and the carriages allowed to act as shoes for gripping the pavement over an extended two dimensional area. Also, castors or balls may be mounted on the support in a suitable manner in place of the rollers shown.

This invention is, of course, not restricted to the mounting of the support on the under side of the front axle but it may be attached to any other convenient part of the vehicle as, for example, on the frame shown in Figure 4. In this construction there is shown a support 108 similar to the support shown in Figure 8 mounted on the front of the frame and held by bolt 109.

In installing the device forming the subject matter of this invention on a vehicle, it is apparent that any one of the several types of supports which have been illustrated, or other modified forms, may be employed and the same fixed to the under side of the front axle of a vehicle in any convenient manner or to any other part of the vehicle upon which it is found desirable to attach the same. The invention is likewise not limited to any particular operating mechanism for lowering or raising the same as the form described is, of course, subject to modification, and any arrangement capable of raising and lowering the support is satisfactory for the purpose of practicing the invention.

In using the support, if the free turning of the steering wheels is desired or if it is wished to move one end of the vehicle in an area too confined for manipulation of the steering wheel, the support may be lowered to contact with the roadway upon which the vehicle is resting, whereupon by movement of the car in either direction, according to whether the support is positioned in the front or rear of the mounting, the end of the car may be elevated and the wheels freely turned.

If rollers are employed on the bottom of the support the support may be locked in the vertical position and the end of the car either pushed in the desired direction, or if there is sufficient slope in the crown of the road the vehicle allowed to roll, the side movement of the vehicle being controlled by application of the brakes on the rear wheels. When further use of the device is no longer desired the support may be raised and locked into position above the road clearance of the vehicle.

There is accomplished by this invention a device for simultaneously relieving the weight on the steering wheels of a vehicle or elevating one end of the same, upon movement of the vehicle, that affords facility in directing a course while the vehicle is operating in confined areas, on which the end of the vehicle elevated may be moved in a direction opposite the normal line of travel and when use of the device is discontinued the same raised above the road clearance of the vehicle.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A device of the character described for relieving at least part of the weight on at least one of the steering wheels of a vehicle comprising a compression element supported on the vehicle, and upon which the vehicle is adapted to be driven by either forward or backward movement of the vehicle, depending upon the initial point of contact of the compression element with the roadway, and single spring means tending to move and to hold the compression element into operative relation to the roadway for raising the vehicle by either said forward or backward movement.

2. A vehicle lifting device comprising a support having a base contact portion, said support being capable of either forward or backward movement to raise the vehicle, arms extending upwardly from the base portion for pivoting on the vehicle, and a helical spring connected to the base portion of the support and the vehicle, tending to maintain the support in a vertical position.

3. A vehicle lifting device comprising a support having a base contact portion, said support being capable of either forward or backward movement to raise the vehicle, arms extending upwardly from the base portion for the pivoting on the vehicle, and a spring member mounted on the vehicle having the ends connected to the corresponding arms of the support tending to move the support to a vertical position and to keep it there.

4. A vehicle lifting device comprising a support having a base contact portion, said support being capable of either forward or backward movement to raise the vehicle, arms extending upwardly from the base portion having the ends turned over for pivoting the support on the under side of a vehicle, and a spring helically wound around one of the turned over portions having one end fixedly held adjacent the turned over portion and the other end extending downwardly and similarly held adjacent the arm, tending to move the support to a vertical position and to hold it there.

JOHN LESTER BARR.